June 2, 1964  R. K. JACK, JR  3,135,173

DIAPHRAGM

Filed Oct. 26, 1961  2 Sheets-Sheet 1

INVENTOR.
ROBERT K. JACK JR.
BY
ATTORNEY.

June 2, 1964   R. K. JACK, JR   3,135,173
DIAPHRAGM

Filed Oct. 26, 1961   2 Sheets-Sheet 2

INVENTOR.
ROBERT K. JACK JR.
BY
ATTORNEY.

United States Patent Office 3,135,173
Patented June 2, 1964

---

3,135,173
DIAPHRAGM
Robert K. Jack, Jr., Lansing, Mich., assignor to Midland-Ross Corporation, Cleveland, Ohio, a corporation of Ohio
Filed Oct. 26, 1961, Ser. No. 147,891
2 Claims. (Cl. 92—103)

This invention relates to diaphragms and particularly to flexible diaphragms used in fluid actuators.

Diaphragms of the type employed in fluid actuators such as air brake actuators on trucks and trailers are made of a layer of re-enforcing fabric sandwiched between layers of flexible material such as rubber or synthetic rubber. The various layers form an integral, one-piece diaphragm which is normally supported at its periphery within a housing. Upon introduction of fluid pressure such as compressed air at one side of the diaphragm, the latter is distorted to move its central portion against a push plate or piston to transmit movement to a brake actuator or other device to be actuated.

Diaphragms of this type are subject to abrasion and wear in the area of contact with the push plate and particularly along a line contacted by the periphery of the push plate. It is particularly important that the fabric layer is located well within the enveloping rubber at this line. Unfortunately, it is difficult to distribute the layer of fabric uniformly throughout the diaphragm, particularly in contoured diaphragms, because the fabric layer tends to locate near the surface of inside radii. As soon as the rubber material wears away the fabric is exposed to wear and subsequently weakens sufficiently to burst under pressure and make the diaphragm inoperative.

It is a general object of the invention to provide a diaphragm in which the re-enforcing fabric layer is disposed uniformly in the enveloping rubber material and particularly well removed from the outer surface at the inside radii of cup-shaped diaphragms.

It is a further object of the invention to provide a method of manufacturing such diaphragms in which the fabric liner is positively positioned at the inside radii, well within the rubber material.

A further object of the invention is to provide a diaphragm which incorporates a plurality of fillets or ribs at the inside radii which keeps the re-enforcing liner spaced from the push plate to avoid abrasion and wear.

Still another object of the invention is to provide a diaphragm so constructed and arranged that it remains in proper alignment with the piston or push plate which it actuates.

These and other objects are attained by the present invention, various novel features of which will be apparent from the following description and from the accompanying drawings disclosing a preferred embodiment of the invention.

In the following description it is to be understood that the expression rubber is to be broadly construed to include natural rubber as well as synthetic compounds that can be used in diaphragms as a substitute or adjunct to rubber.

Figure 1:
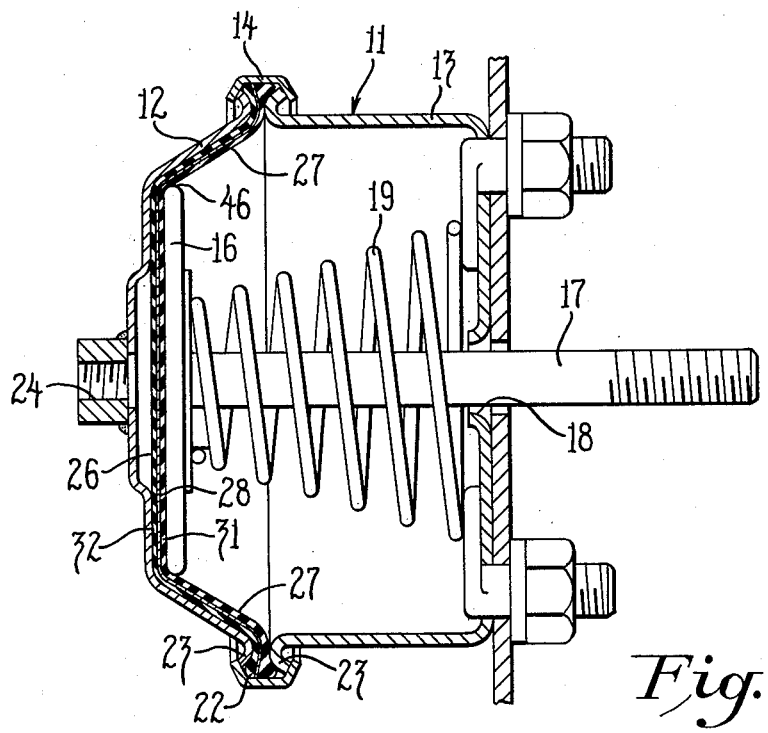
FIGURE 1 is a central vertical sectional view of an air brake actuator.
Figure 2:
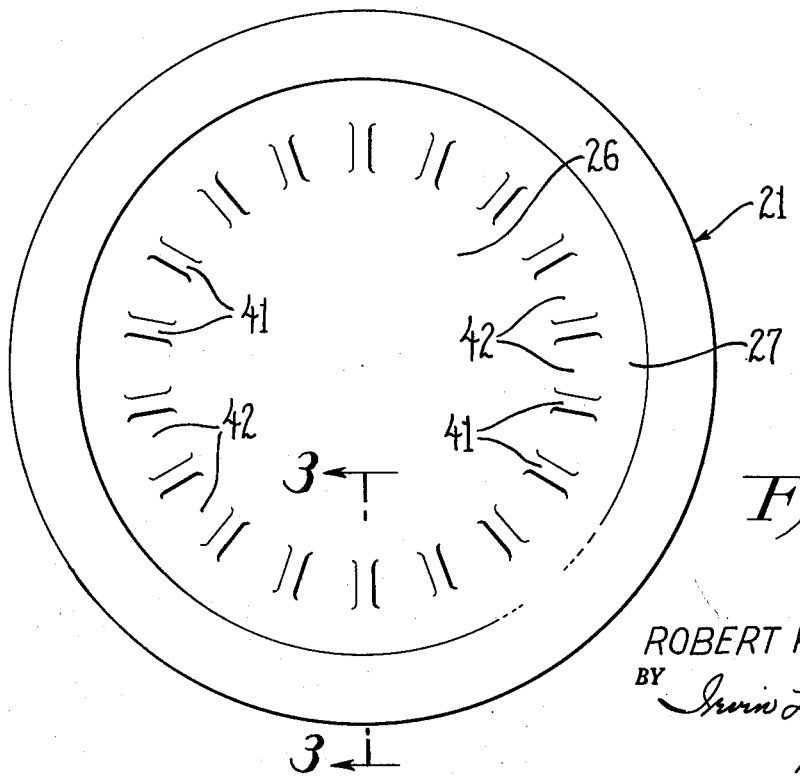
FIGURE 2 is an enlarged view of a diaphragm embodying features of the present invention and incorporated in such actuators.

FIGURES 1 and 2 illustrate a conventional air brake actuator 11 of the type used on trucks. The actuator is of conventional construction and comprises a chamber of separable housing parts 12 and 13 held together at their flanged peripheries by a channel-shaped clamp band 14. A movable piston 16 is disposed within the chamber and is provided with a rod 17 that extends through an opening 18 in one of the housing parts 13. The exposed end of the rod 17 is adapted for connection to a brake actuator or other device to be actuated. Such a device and connection is not illustrated since it is well known in the art and its description is not necessary to a full understanding of the invention. A spring 19 surrounds the connecting rod and reacts at its opposite ends against the housing part 13 and the piston 16 to continuously urge the latter to the left as viewed in FIGURE 1.

A resilient diaphragm 21 of circular shape has a flanged portion 22 at its periphery which is completely clamped between the flanges 23 of the housing parts 12 and 13 to seal opposite sides of the diaphragm 21 from each other. Upon admission of compressed air through a port 24, the diaphragm is deflected to the right and consequently, the piston 16 is moved to the right against the resistance of the spring 19 so that the rod 17 is operative to actuate its associated device. Upon release of the air pressure from the housing through the port 24, the diaphragm 21 relaxes to its normal, as-molded position shown in FIGURE 1 and the spring 19 urges the piston 16 toward its original position.

In its normal, as-molded position shown in FIGURE 1, the diaphragm 21 is cup-shaped having a flat bottom portion 26 generally conforming in size and shape to the surface of the piston 16. The bottom portion merges with an annular side wall 27 which in turn terminates in the flange 22.

Within the rubber-like material of the diaphragm 21 is a re-enforcing member 28 made of thread or cord fabric. Ideally, the re-enforcing member is disposed centrally of the diaphragm 21, i.e., the member 28 is disposed between substantially equal thicknesses of rubber indicated at 31 and 32. The re-enforcing member 28 furnishes the required strength to the diaphragm while the rubber material acts to make the diaphragm impervious to air pressure.

When diaphragms are incorporated in an actuator such as shown in FIGURE 1, they are subject to the greatest wear and abrasion in the area of contact with the piston 16 and particularly along a circumferential line adjacent the peripheral edge of the piston. This line is located very near the line at which the bottom 26 merges with the sides 27 of the cup portion of the diaphragm. It has been found that during the process of manufacture, the liner 28 tends to locate close to the inside radius or to the curve formed by the bottom and side walls. Consequently, the most vulnerable portion of the diaphragm, i.e., the portion at which the re-enforcing member 28 is closest to the surface, is subjected to the greatest wear and abrasion. This shortcoming has been overcome by an improved structure and method of manufacture.

Figure 4:
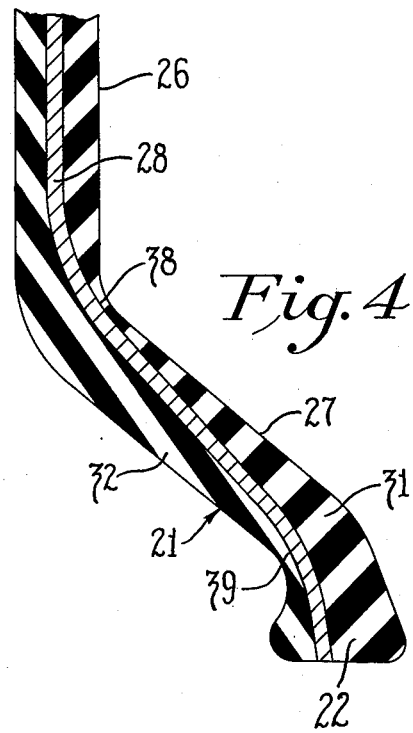
FIGURE 4 is a view similar to FIGURE 3 but showing prior art construction.
Figure 5:
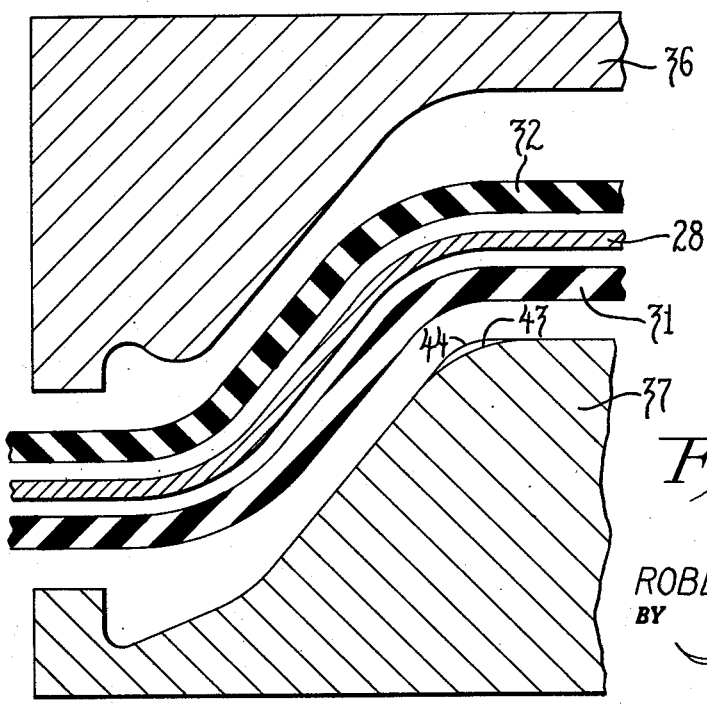
FIGURE 5 is a generally schematic view showing the method of construction of the diaphragm in FIGURES 2 and 3.

Diaphragms of this type are usually manufactured by a process which employs separable molds parts 36 and 37 (FIGURE 5). A sheet of uncured rubber material is laid in the bottom mold to form the layer 31. A fabric re-enforcing member 28 is formed in a separate press and positioned over the first layer of rubber 31 and subsequently a second layer of rubber 32 is positioned over the re-enforcing member. The upper and lower molds 36 and 37 are moved toward each other to press the various layers into contact with each other. Subsequently, the rubber layers 31, 32 and the re-enforcing member 28 are cured under heat and pressure into an integral diaphragm. In such a process, it has been found that the liner 28 tends to locate near the inside of curves in the contoured diaphragm as indicated at 38 and 39 in FIGURE 4.

Figure 3:
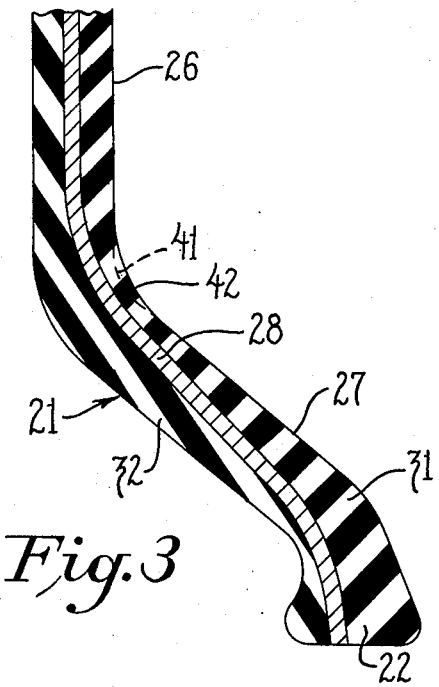
FIGURE 3 is a partial section taken generally on line 3—3 in FIGURE 2 but at a further enlarged scale.

As best seen in FIGURE 2, the diaphragm 21 incorporating features of the present invention includes a plurality of symmetrically disposed ribs 41 formed at the curved inner surface 42 of the cup-shaped diaphragm between the bottom 26 and side wall 27. This is formed during the process of manufacture by appropriately shaping the mold 36 with slots 43 conforming in size and location to the ribs 41. When the mold halves 36 and 37 are moved toward each other, the uncured layers of rubber 31 and 32 enter the slots 43. Upon curing of the rubber, this portion of the material forms the ribs 41. The surfaces 44 of the mold adjacent the slots 43 depress the uncured material uniformly a greater amount than the adjoining material in the slots to position the liner 28 so that it bridges the slots. This insures that upon completion of the diaphragm the re-enforcement will be disposed at least the depth of the ribs 41 away from the inner curve 42. This results in a diaphragm with the re-enforcing member located as shown in FIGURE 3.

During operation of the actuator 11 incorporating a diaphragm of this type, the ribs 41 of the diaphragm 21 act as guards between the peripheral edge 46 of the piston and the re-enforcing layer 28 to absorb any abrasion between the piston 16 and the diaphragm 21. Furthermore, the ribs minimize wear by acting to locate the piston relative to the diaphragm. For example, in conventional construction upon return of the piston to the left in FIGURE 1 under the urging of the spring 19, it is not uncommon for the piston to become slightly misaligned so that diametrically opposed points on the edge 46 of the piston contact a portion of the side wall 27 and bottom 26, respectively. This causes undue wear and speeds up deterioration of the diaphragm. In the present arrangement, however, the piston if it should be misaligned with the diaphragm is guided by the ribs 41 to locate it properly relative to the bottom portion 26.

It has been found under vigorous cycling tests that the diaphragm made in accordance with the present invention has a much greater life than conventional diaphragms, the increase in life being in the order of 50% or more.

An improved construction and method of manufacturing has been disclosed which results in a diaphragm having a properly located re-enforcing layer protected by bumper-like ribs which also act to properly align the diaphragm and its coacting piston.

It should be understood that it is not intended to limit the invention to the above described forms and details, and that the invention includes such other forms and modifications as are embraced by the scope of the appended claims.

It is claimed and desired to secure by Letters Patent:

1. A cup shaped diaphragm of fabric reinforced resilient material for use in an actuator having a piston adapted to engage said diaphragm, said diaphragm having an annular lip adapted for connection to an actuator housing, an annular wall merging with said lip, a bottom wall substantially the size of said piston and merging with said annular wall to form a cup, and at least several radially extending ribs disposed within said cup in uniformly spaced relation to each other with opposite ends of each of said ribs terminating adjacent the juncture of said annular wall and said bottom wall and being homogeneous therewith.

2. A diaphragm for use with an actuator having a movable piston, said diaphragm including an outer annular lip, a center disk-shaped portion, said lip and disk portion being disposed in parallel spaced planes, an annular wall extending between the outer circumference of said disk portion and the inner circumference of said lip and merging with said disk and lip, a single layer of flexible woven fabric conforming in shape to said lip, disk, and wall and being imbedded between layers of resilient material, and at least several ribs formed by said resilient material and extending radially between said planes in uniformly spaced relation to each other adjacent the juncture of and merging with said disk and wall, opposite ends of said ribs terminating on said disk and on said wall at points substantially equally spaced from said juncture of said disk and wall, said ribs being adapted to engage the periphery of said piston and maintain it in spaced relation to that portion of the flexible fabric layer at said juncture of said disk and wall.

References Cited in the file of this patent
UNITED STATES PATENTS

| | | |
|---|---|---|
| 945,992 | Stevens | Jan. 11, 1910 |
| 1,914,600 | Hewitt | June 20, 1933 |
| 2,192,548 | Gunderson | Mar. 5, 1940 |
| 2,545,857 | Perkins | Mar. 20, 1951 |
| 2,697,057 | Senger | Dec. 14, 1954 |
| 2,762,396 | Fawich | Sept. 11, 1956 |
| 2,770,799 | Horn | Nov. 13, 1956 |
| 2,840,339 | Price | June 24, 1958 |
| 2,998,343 | Gold | Aug. 29, 1961 |
| 3,020,020 | Boteler | Feb. 6, 1962 |